US011872177B1

(12) United States Patent
Graham

(10) Patent No.: US 11,872,177 B1
(45) Date of Patent: Jan. 16, 2024

(54) MOUNTED MASSAGE ROLLER

(71) Applicant: Gary Graham, Bellingham, WA (US)

(72) Inventor: Gary Graham, Bellingham, WA (US)

( * ) Notice: Subject to any disclaimer, the term of this patent is extended or adjusted under 35 U.S.C. 154(b) by 491 days.

(21) Appl. No.: 17/020,730

(22) Filed: Sep. 14, 2020

Related U.S. Application Data

(60) Provisional application No. 62/899,672, filed on Sep. 12, 2019.

(51) Int. Cl.
*A61H 15/00* (2006.01)

(52) U.S. Cl.
CPC ..... *A61H 15/00* (2013.01); *A61H 2015/0035* (2013.01); *A61H 2201/0123* (2013.01); *A61H 2201/1253* (2013.01); *A61H 2201/1635* (2013.01); *A61H 2201/1669* (2013.01)

(58) Field of Classification Search
CPC .... A61H 2201/0123; A61H 2201/0126; A61H 2007/009; A61H 2015/0021; A61H 15/00; A61H 15/0085
See application file for complete search history.

(56) References Cited

U.S. PATENT DOCUMENTS 4,154,427 A 5/1979 Hofmann
4,520,798 A 6/1985 Ewis
5,174,282 A 12/1992 Bleggi
5,913,749 A * 6/1999 Harmon ............. A63B 21/1672 482/129
7,087,004 B1 8/2006 Berke
7,682,297 B2 3/2010 Graham
8,465,443 B2 6/2013 Yang
9,364,385 B2 6/2016 Yang
10,327,981 B1 * 6/2019 Ayotte .................. A61H 1/008
10,434,351 B1 * 10/2019 Addison ................ A63B 23/04
2005/0049531 A1 3/2005 Kim
2007/0225627 A1 * 9/2007 Cox .................. A61H 15/0092 601/112
2008/0097262 A1 4/2008 Adams
(Continued)

FOREIGN PATENT DOCUMENTS

DE 202007013913 U1 3/2008

OTHER PUBLICATIONS

Pickens et al. "High-Strength Aluminum P/M Alloys," 1990, ASM Handbook, vol. 2: Properties and Selection: Nonferrous Alloys and Special-Purpose Materials, 200-215 (Year: 1990).*
(Continued)

*Primary Examiner* — Samchuan C Yao
*Assistant Examiner* — Tina Zhang
(74) *Attorney, Agent, or Firm* — Dwayne Rogge

(57) ABSTRACT

A mounted massage roller comprising in one example: a mounting assembly configured to be mounted to a fixed structure; a pivot assembly attached to the mounting assembly at a hinge forming a horizontal hinge axis about which the hinge rotates; the pivot assembly rotatable about the hinge axis relative to the mounting assembly; the pivot assembly comprising at least one handle configured to be grasped by a patient to rotate the pivot assembly about the hinge; the pivot assembly at least one roller configured to roll about a roller axis parallel to the hinge axis; each roller having a radially outward surface configured to roll against the patient as the patient moves the pivot assembly about the hinge axis.

5 Claims, 11 Drawing Sheets

(56) References Cited

U.S. PATENT DOCUMENTS

| | | | | |
|---|---|---|---|---|
| 2010/0121235 | A1* | 5/2010 | Sasano | A61H 7/001 601/134 |
| 2011/0021959 | A1 | 1/2011 | Brown | |
| 2012/0028765 | A1* | 2/2012 | Morin | A63B 21/00047 482/91 |
| 2013/0012851 | A1 | 1/2013 | Fahmie | |
| 2013/0165827 | A1 | 6/2013 | Liu | |
| 2014/0114221 | A1* | 4/2014 | Indermill | A61H 15/0092 601/120 |
| 2015/0342815 | A1 | 12/2015 | Watson et al. | |
| 2016/0166465 | A1 | 6/2016 | Marson | |
| 2016/0324717 | A1* | 11/2016 | Burton | A61H 7/001 |
| 2016/0338901 | A1 | 11/2016 | Cohen | |
| 2017/0224578 | A1* | 8/2017 | Beesley | A61H 15/0092 |

OTHER PUBLICATIONS

AAH Back Massage Inc., "A Revolutionary Back Massage Solution", http://www.aahbackmassageinc.com/how-to-use/, accessed Nov. 4, 2018, 3 pages.

Better Fitness products.com; "RumbleRoller and RR Beastie", https://www.betterfitnessproducts.com/rumbleroller.html, accessed Nov. 4, 2018, 7 pages.

Massage Magazine Products Directory, "Backarc Pro", https://www.massagemag.com/products-directory/product/backarc-pro/, accessed Nov. 4, 2018, 7 pages.

* cited by examiner

MOUNTED MASSAGE ROLLER

RELATED APPLICATIONS

This application claims priority of U.S. Provisional Patent Application Ser. No. 62/899,672 filed on Sep. 12, 2019 incorporated herein by reference.

BACKGROUND OF THE DISCLOSURE

Field of the Disclosure

This disclosure relates to the field of massage devices operated by the patient. The massage device mounted to a fixed structure so to maximize efficiency and force available to the patient.

BRIEF SUMMARY OF THE DISCLOSURE

Disclosed herein is a mounted massage roller comprising in one example: a mounting assembly configured to be mounted to a fixed structure; a pivot assembly attached to the mounting assembly at a hinge forming a horizontal hinge axis about which the hinge rotates; the pivot assembly rotatable about the hinge axis relative to the mounting assembly; the pivot assembly comprising at least one handle configured to be grasped by a patient to rotate the pivot assembly about the hinge; the pivot assembly at least one roller configured to roll about a roller axis parallel to the hinge axis; each roller having a radially outward surface configured to roll against the patient as the patient moves the pivot assembly about the hinge axis.

The mounted massage roller may be arranged wherein the fixed structure is a door, post, wall, exercise equipment, or other stationary structure.

The mounted massage roller as recited may be arranged wherein the pivot assembly is vertically positionable on the mounting assembly.

The mounted massage roller may be arranged wherein each roller has an outer diameter of between 2" and 8".

The mounted massage roller may be arranged wherein each roller has an outer surface having a Young's modulus on the order of (GPa) 30-70.

DETAILED DESCRIPTION OF THE DISCLOSURE

In medical fields it is often desired to use a roller massage with a resilient/malleable roller on a patient to loosen muscle tissue and manipulate hard and/or soft tissue. Often this sort of massage can be accomplished by a patient by themselves with proper training and without direct application from a practitioner. Self-massage saving time and money over techniques where a practitioner must be present and actively engaged in the massage.

Rolling massage is one form of myofascial release that a patient can do on their own body. Rolling massage often is prescribed and helps myofascial issues by massaging or releasing muscle and fascial tightness. The roller applies pressure, helping to break up 'knots' that can form in the patient's muscles and tissue. These knots occur when muscle fibers or the bands of tissue called fascia underneath them tense and tighten.

To use a massage roller, a patient will slowly run the roller down stiff muscles (such as their calves, hamstrings, quads, Iliotibial (IT) bands, neck, and middle back), the patient will often use their own body weight by leaning against the roller to apply as much pressure to the area being massaged as feels comfortable. A patient will often start by rolling along the length of the affected muscle, then follow up with small rolls over any spots that are tender.

The patient may take long breaths as they roller massage, as this helps to increase the flow of blood and oxygen to their muscles. While some rollers have a smooth outer surface, other rollers have raised sections, which can exert force deeper into the muscles. A mixture of smooth and bumpy textures is often used to mimic the actions of a massage therapist, which can help to reduce muscle tension.

Rolling massage is known to help reduce pain and muscle soreness following strain or injury. Massaging the muscles increases blood flow and oxygen to the tissue, helping the natural healing process.

Rolling massage also helps with flexibility. Rolling massage, together with stretching and rehabilitation, can help lengthen muscles when used correctly.

Rolling massage helps to manage the effects of stress. Stress-related knots can lead to discomfort, which can impact on sleep.

Rolling massage can help to have an increased range of motion by stretching and lengthening muscles.

Rolling massage can help to prevent common injuries because tight muscles can be more prone to injury.

Rolling massage may help to reduce cellulite, as the increased blood flow can help your body's natural detoxification processes.

Figure 11:
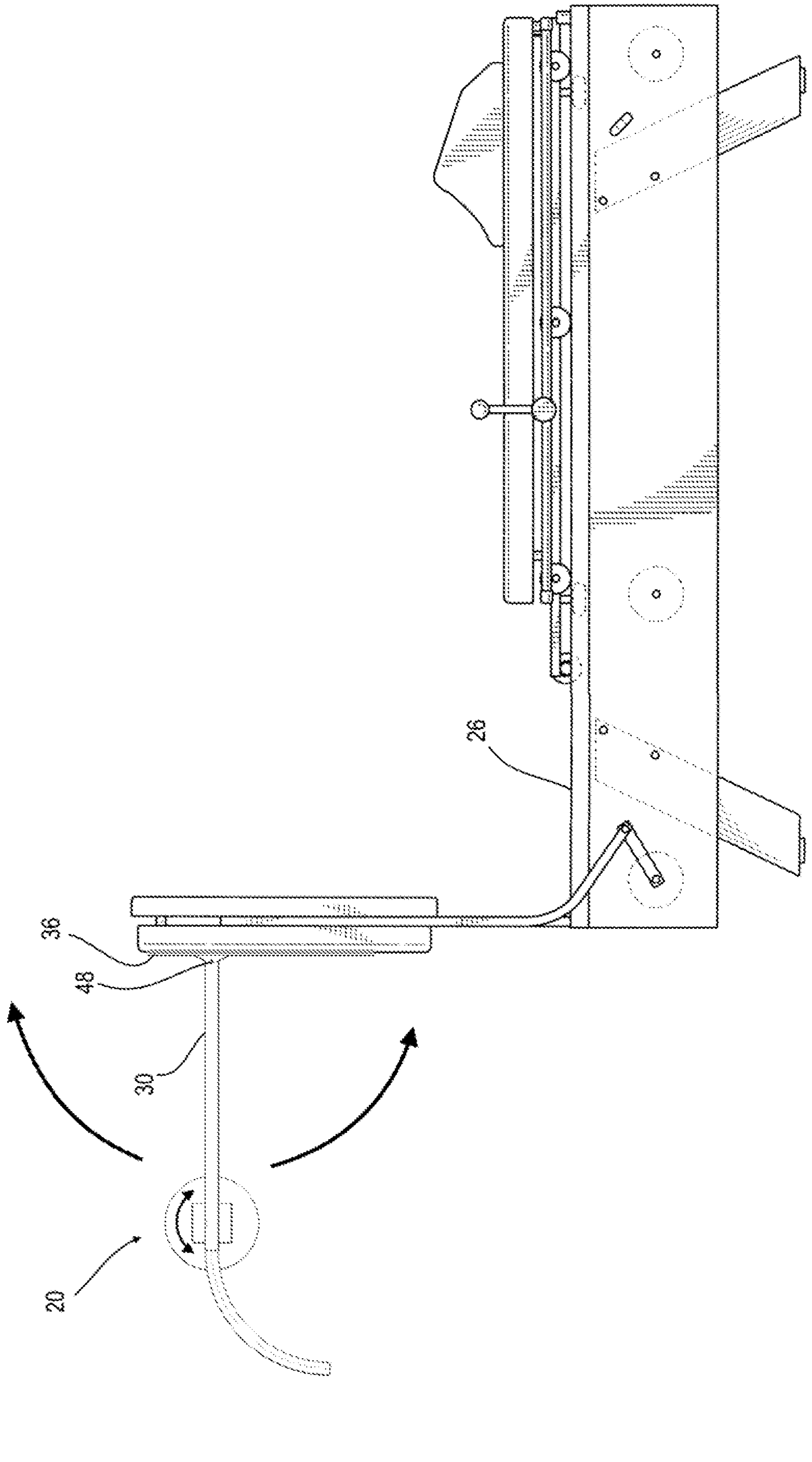
FIG. 11 is a side isometric view of the mounted massage roller attached to an exercise apparatus.

To provide a more efficient, roller massage device, the mounted massage roller 20 disclosed herein has been devised. Portions of the mounted massage roller 20 is configured to be mounted to a fixed structure 22 such as a door 24, exercise equipment 26, wall, post, or other component that does not move when the mounted massage roller 20 is operated. In one example, the stationary exercise device to which the roller is mounted may be similar to the stationary exercise table disclosed in U.S. Pat. No. 7,682,297 incorporated herein by reference as an exercise device 26 shown in FIG. 11.

Figure 1:
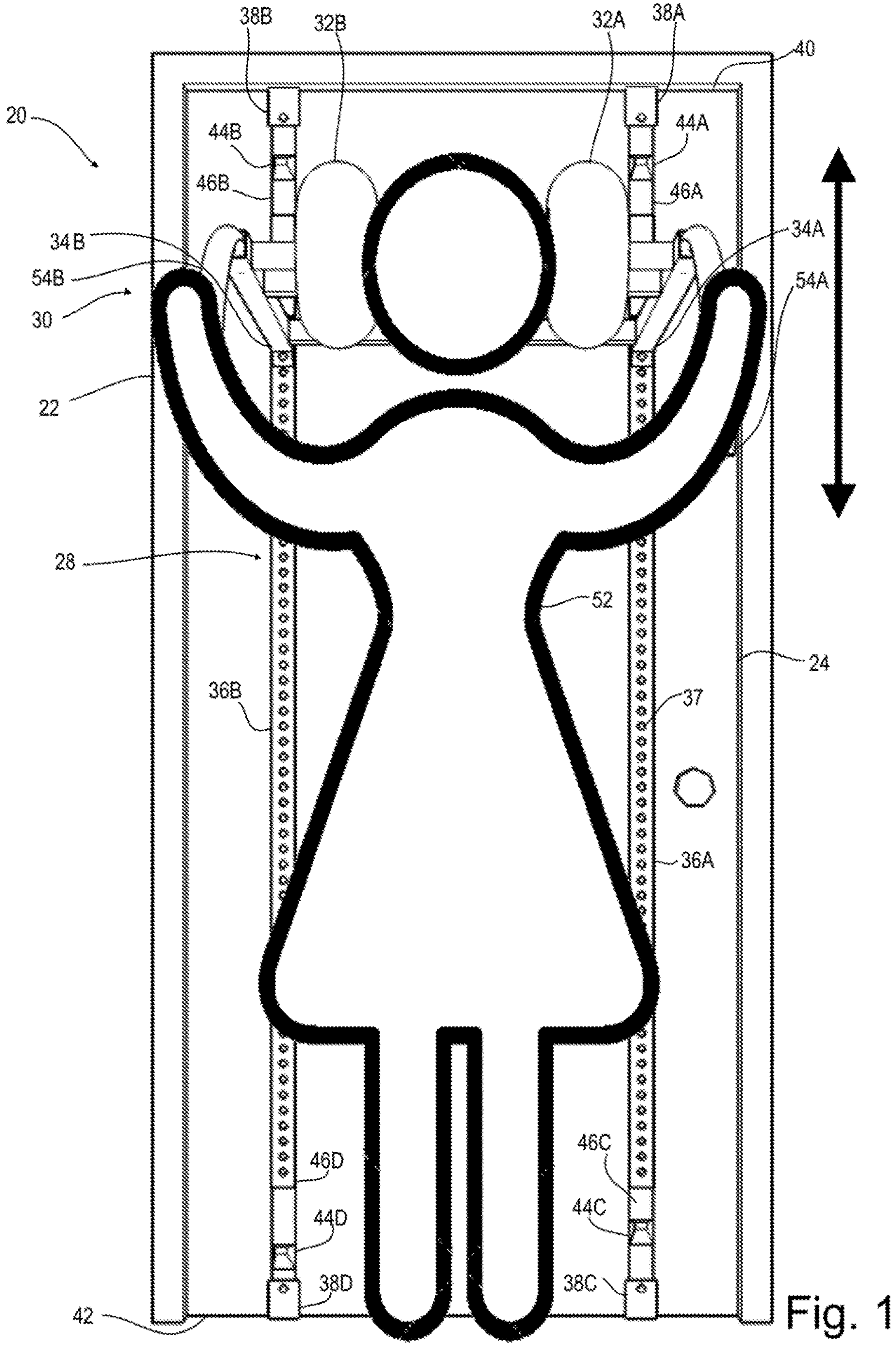
FIG. 1 is a front perspective view of one example of the mounted massage roller attached to a door.

In the example shown in FIG. 1, the mounted massage roller 20 comprises a mounting assembly 28, and a pivot assembly 30 rotatably attached to the mounting assembly 28. The pivot assembly 30 allowing the roller 32 or rollers 32A/32B to be rotated about a hinge 34 formed between the mounting assembly 28 and the pivot assembly 30. A numbering system is used in this disclosure where a component which is duplicated may have a generic numeral label (e.g. roller 32) and independent examples of a duplicated component include an alphabetic suffix (e.g. roller 32A). In addition, alternate examples such as shown in FIGS. 12-20 and FIGS. 21-24 have a prefix (1 and 2 respectively) for similar components such as the roller 32, 132, and 232.

Figure 12:
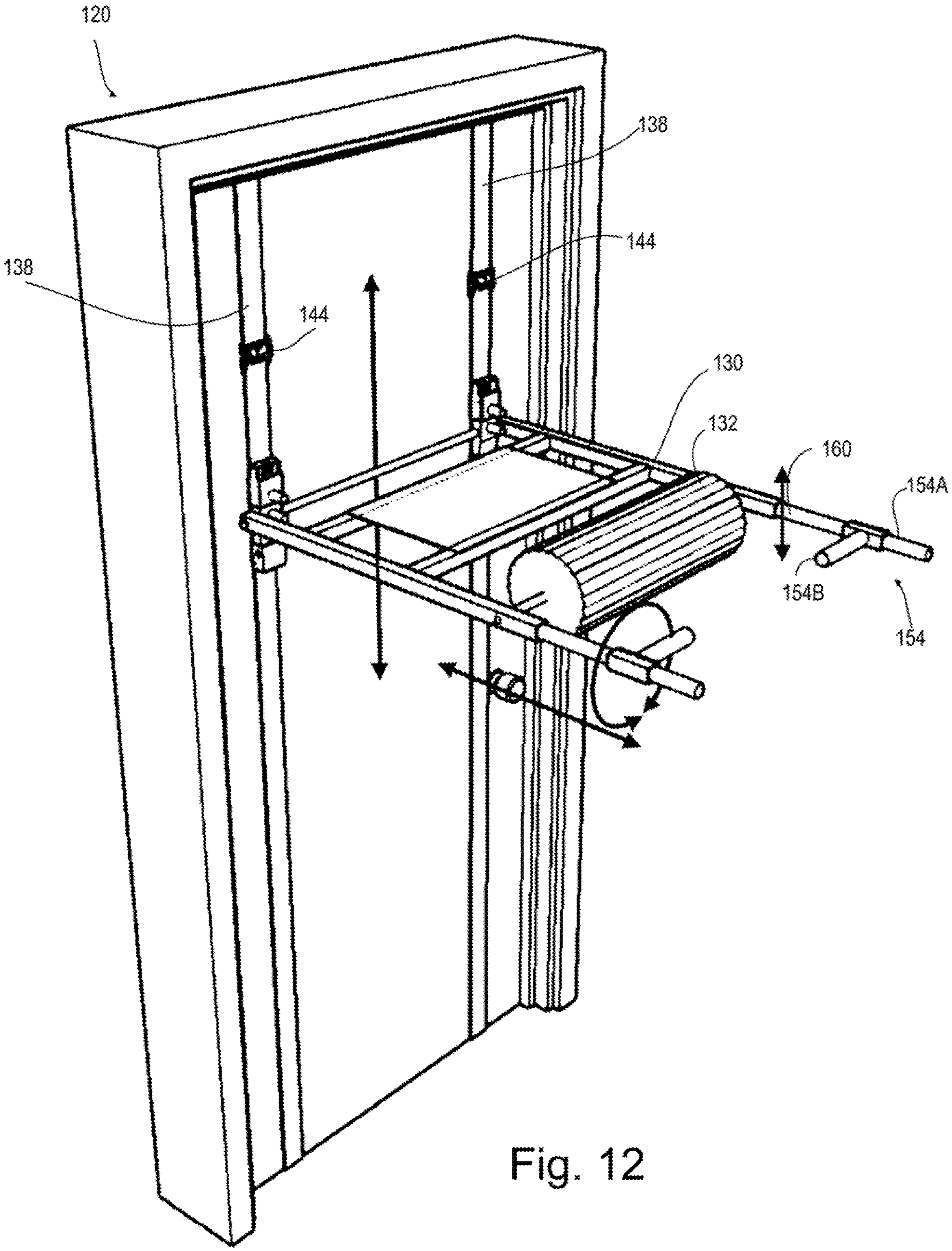
FIG. 12 is a perspective environmental view of another example of the mounted massage roller attached to a door.
Figure 13:
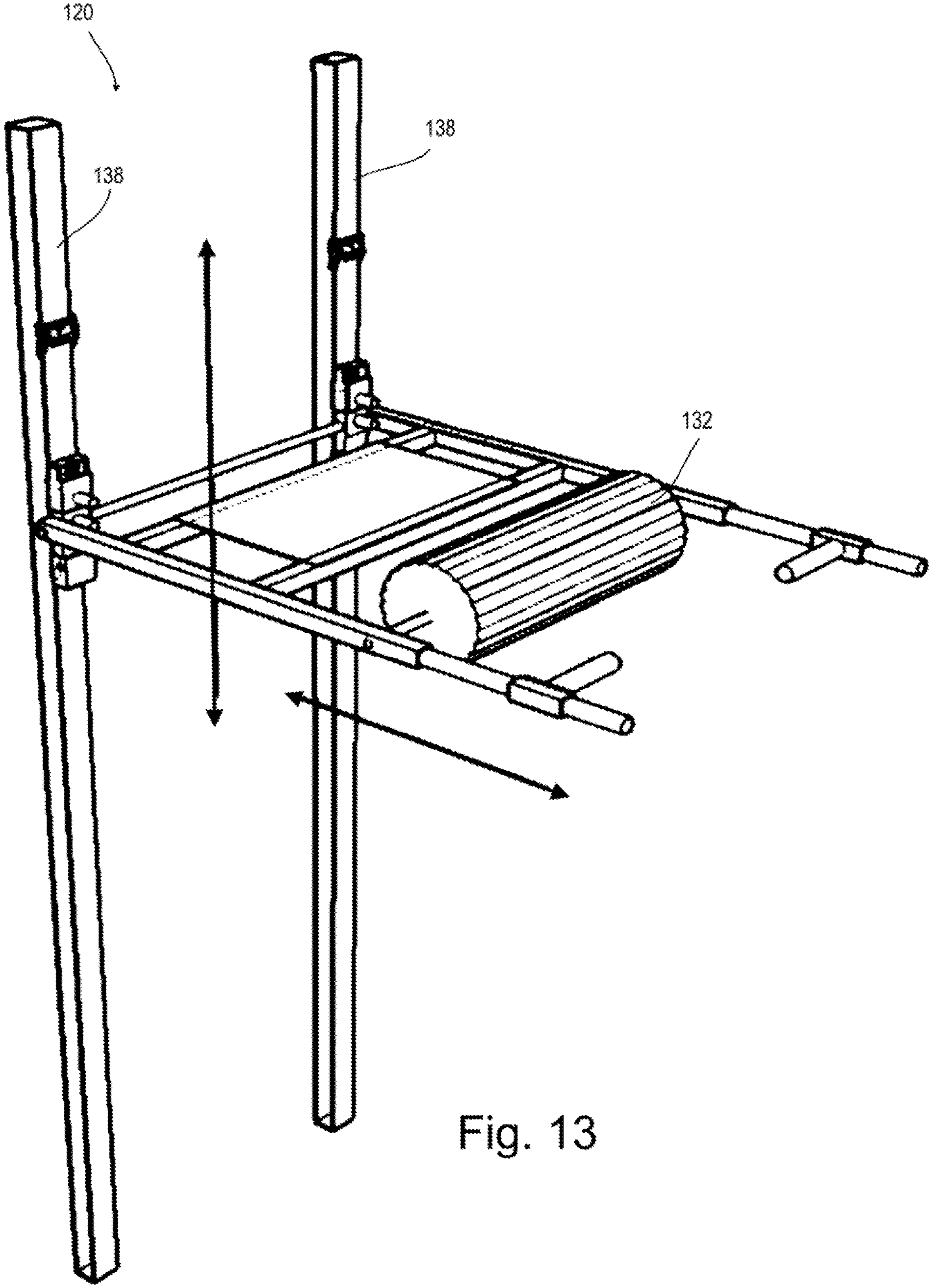
FIG. 13 shows the example of FIG. 12 without the door.

Looking to FIG. 1 it can be seen that the mounting assembly 28 comprises a plurality of rails 36 (36A, 36B) attached at either end to upper brackets 38 (A-D). The rails 36 may be rigid components such as metal bars or tubes, or may be non-rigid components such as straps, webbing, ropes, chain, cables, etc. as shown in FIG. 12.

In one example, the pivot assembly is vertically positionable along the rails 36, by sliding or other methods. Indexing holes 37, detents, protrusions, cam locks, or other structures may be used to vertically position the pivot assembly along the rails 36.

The rails 36 are fixed to the door 24 via the upper brackets 38A, 38B. These upper brackets in one example are u-shaped brackets fitting over the upper or top edge 40 of the door 24. These brackets support the rails 36 vertically and hold the brackets 36 from falling downwards.

The rails 36 may be similarly fixed to the door 24 by way of lower brackets 38C and 38D in a similar manner to the way the upper brackets. These lower brackets 38C, 38D may also be generally u-shaped and fit to the lower edge 42 of the door 24. The lower brackets provide tension to the upper brackets 38A, 38B and again, hold the rails 36 in position vertically. The combination of upper brackets and lower brackets providing tension against the door, thus holding the apparatus in place horizontally as well.

To ensure that the mounted massage roller 20 is securely attached to doors 24 of varying vertical dimensions, an adjuster 44 (44A-44D) may be used on the upper and/or lower segments between the rail(s) 36 and the brackets 38. One such adjuster is disclosed in U.S. Pat. No. 4,154,427A incorporated herein by reference. The adjuster 44 providing a structure for adjusting the tension between the upper brackets and the lower brackets so as to secure the pivot assembly 30 in place.

In one example, the adjuster comprises a ratchet tightener, attached to one or more straps 46 (A-D) that are connected between the longitudinal ends of the rails 36 and adjacent brackets. Tensioning of the adjuster puts the brackets 36 and connected rails 36 in tension around the door 24, thus holding the mounted massage roller 20 in place securely during use.

The rails 36 may also be fixedly attached directly to the door 24, equipment 26, wall, or other fixed structures by screws, bolts, rivets, adhesives, etc.

Figure 7:
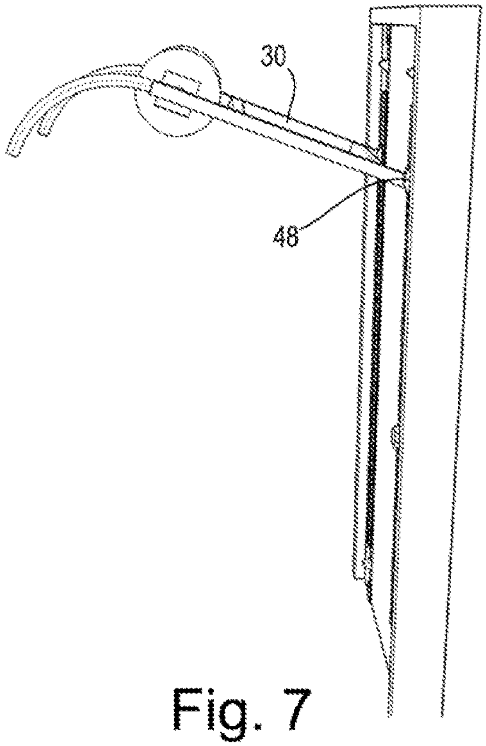
FIG. 7 is a side perspective view of the example shown in FIG. 1 in a first vertical rotational position.
Figure 8:
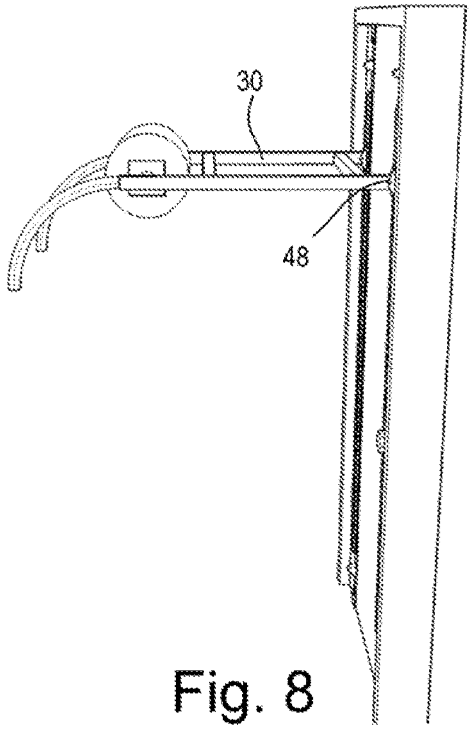
FIG. 8 is a side perspective view of the example shown in FIG. 1 in a second vertical rotational position.
Figure 9:
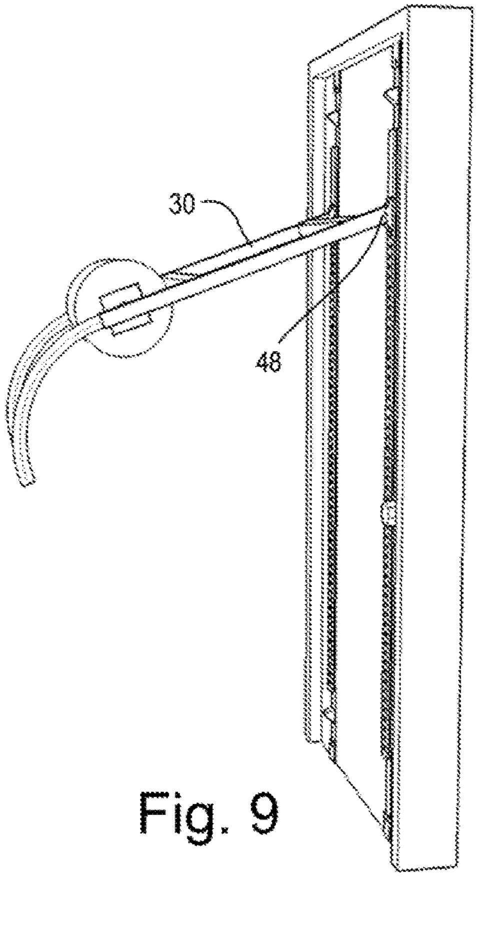
FIG. 9 is a side perspective view of the example shown in FIG. 1 in a third vertical rotational position.

In one example, the pivot assembly 30 is attached to the mounting assembly 28 via the hinge 34 as previously discussed. In one example, the pivot assembly rotates about a horizontal or substantially horizontal hinge axis 48. A hinge plane 50 is also disclosed for ease in explanation, this hinge plane 50 orthogonal to the hinge axis 48. As a patient 52 grasps the handles 54 (54A, 54B), presses against the rollers 56 (56A, 56B) and rotates the pivot assembly vertically in the hinge plane 50 about the hinge axis 48, the patient 52 massages the area of their body in contact with the rollers 56. This can more easily be seen in FIG. 11 where upward and downward rotation of the pivot assembly 30 about the hinge axis 48 is shown. FIG. 7 shows the pivot assembly 30 in a slightly raised position relative to the generally horizontal position shown in FIG. 8. In FIG. 9, the pivot assembly 30 is shown in a position rotationally lower than that shown in FIG. 8.

Figure 2:
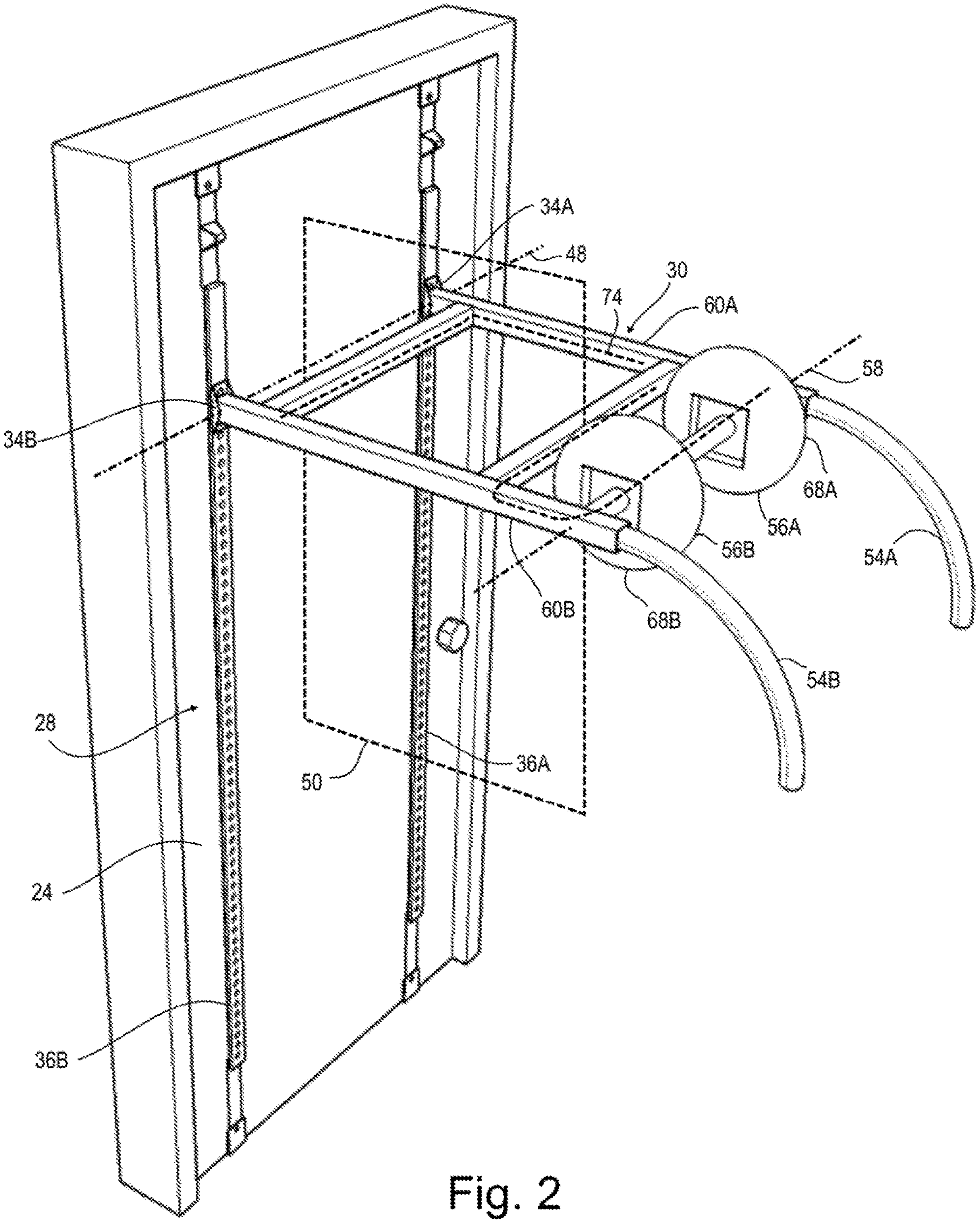
FIG. 2 is a side perspective view of the example shown in FIG. 1.
Figure 3:
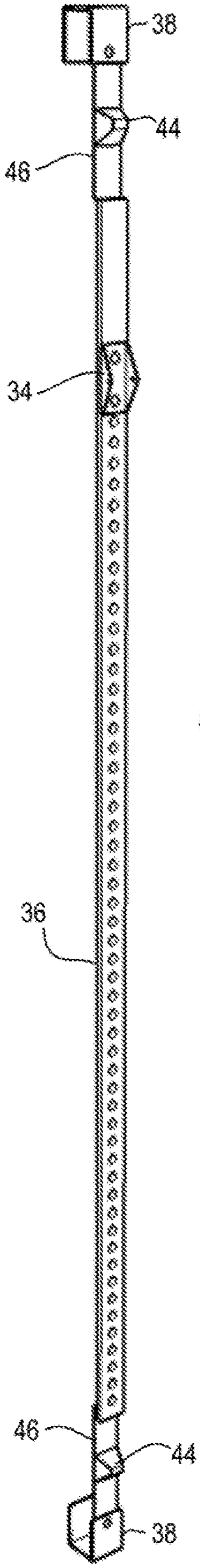
FIG. 3 is a side perspective view of the mounting assembly components of the example show in in FIG. 1.
Figure 4:
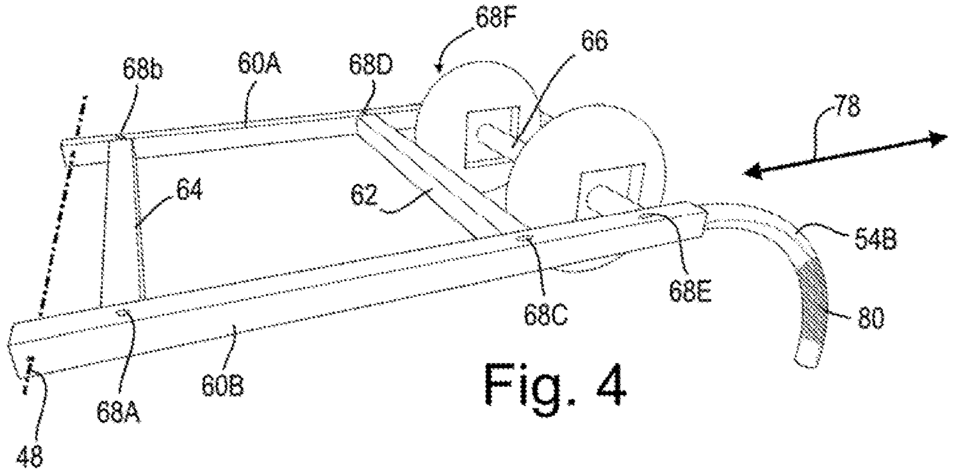
FIG. 4 is a side perspective view of the pivot assembly components of the example shown in FIG. 1.
Figure 5:
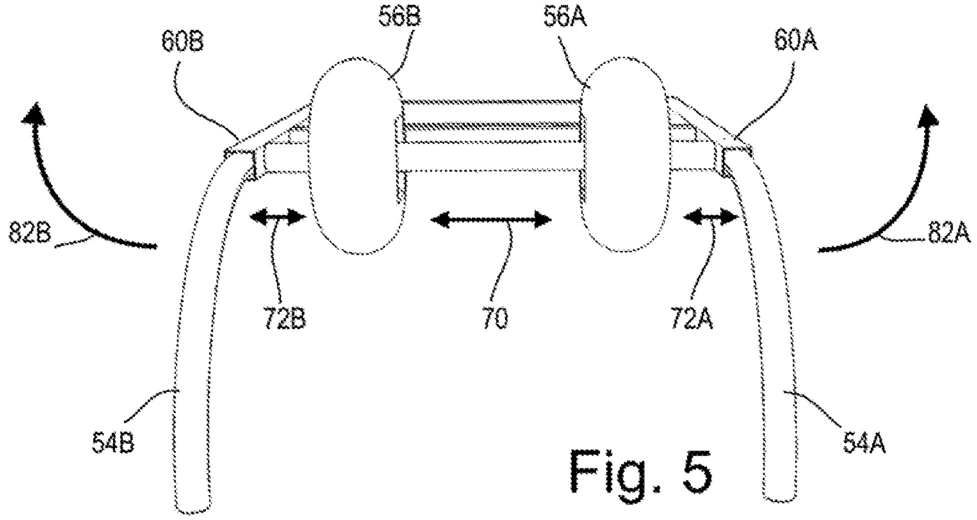
FIG. 5 is a front perspective view of the components shown in FIG. 4.
Figure 6:
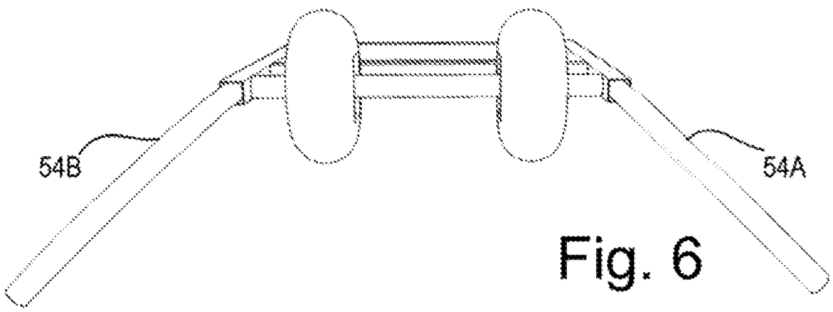
FIG. 6 is a front perspective view of the components shown in FIG. 5 with the handles in a different orientation.

In one example, also depicted in FIG. 2, the rollers 56 rotate about a roller axis 58 parallel to or substantially parallel to the hinge axis 48 and orthogonal or substantially orthogonal to the hinge plane 50. This arrangement of rollers and the hinge eases use of the mounted massage roller 20.

Structurally as shown in the Example of FIG. 2, the pivot assembly comprises a plurality of struts 60 (60A, 60B) extending from the hinge(s) 34 toward the handles 54. These struts 60 being generally rigid and configured to support the compression load of the patient 52 leaning against the rollers 56, and any force exerted upon the handles 56. The struts 60 transferring this compression load through the hinges 34 to the support structure, such as the door 24 or device 26.

To keep the struts 60 in proper position, and to avoid racking, one or more braces 62, 64, 66 may be attached at either end to the struts 60A, 60B. These connections may be removable, and temporarily fixed by way of pins 68 (6aA-68E).

In one example, the brace 66 is configured to transfer the compression load from the patient 52 through the rollers 56 to the struts 60 and then to the hinge 34. Where at least the outer surface 68 of the roller 56 rotates about the roller axis 58, the roller 56 may have a cylindrical inner surface which acts as a roller bearing as the roller 56 rotates about the outer surface of the roller brace 66.

It may be desired to fix the position of the rollers 56A and 56B relative to each other by using spacers, or fixed position roller bearings. Thus, the spacing 70 between the rollers 56, and the spacing 72 between the rollers 56 and the struts 60 can be set and adjusted when needed.

Figure 10:
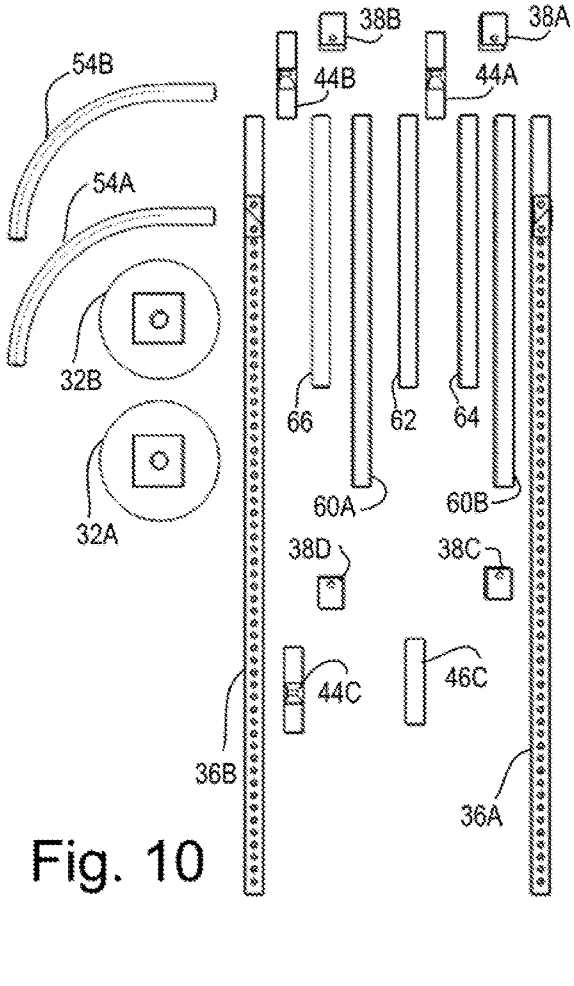
FIG. 10 is an exploded view of the example shown in FIG. 1.

In one example, a cord 74 or equivalent connecter may be used to ease in assembly of the apparatus. In one example this cord passes through portions of the struts 60, through the rollers 56 and through at least portions of the braces 64, 66, 68. Thus when the pivot assembly is disassembled as shown in FIG. 10 (shown without the cord 74 in place) the pivot assembly 30 can only be assembled in one way. In one example, the cord 70 is formed of an elastic material, to draw the struts and braces together in proper orientation.

In one example, the rollers 56, or at least the outer surface of the rollers 56 are formed of a resilient material that at least partially deforms as the patient 52 presses against the rollers 56 but the rollers return to their uncompressed shape quickly. Numerically, this can be represented in that each roller has an outer surface having a Young's modulus on the order of (GPa) 30-70.

Young's modulus or Young modulus is a mechanical property that measures the stiffness of a solid material. It defines the relationship between stress (force per unit area) and strain (proportional deformation) in a material in the linear elasticity regime of a uniaxial deformation.

It may also be desired that the handles 54 are repositionable along line 78 for ease of use and comfort of the patient 52. Movement of the handles in this direction changes the distance between the grasping portion 80 and the roller(s) 56 for patients with a thicker torso, longer arms, or for use in other orientations. In one example, the position may be set by way of indexing pins, push button releases, twist-lock cams, or other structures.

In another example, the handles 54 may be rotated in directions 82A/82B around the structs 60 to alter the grip the patient 52 has on the handles. In one example, the rotational position may be set by way of indexing pins, push button releases, twist-lock cams, or other structures.

FIG. 12 shows another example of the door mounted massage roller 120 where the roller 132 is a single component. This roller 132 may be smooth on the exterior as shown in the previous example or textured as shown in FIG. 12.

Figure 14:
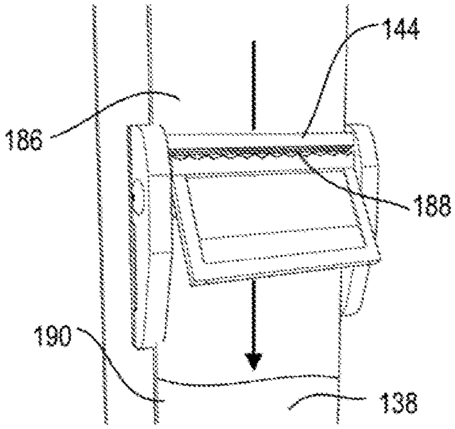
FIG. 14 shows an enlarged view of a buckle component.

In this example, one or more straps 138 are provided which vertically encircle the door 24. A buckle 144 may be provided to establish tension against the door and hold the strap 138 in place as shown in FIG. 14. Generally, a first end 186 of the strap 138 passes through the buckle 144 and is held in place by a clamp 188 while a second end 190 of the strap 138 is fixed to the buckle.

Figure 15:
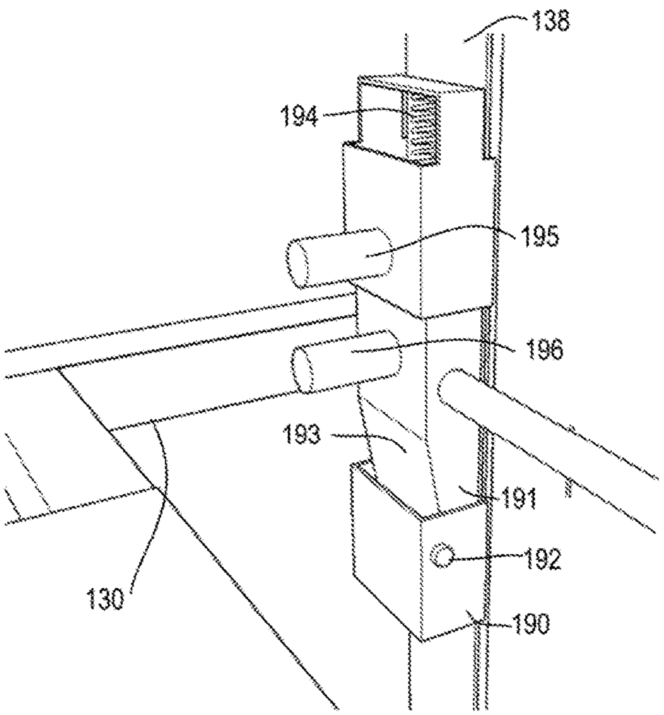
FIG. 15 shows an enlarged view of an adjuster frame component.
Figure 16:
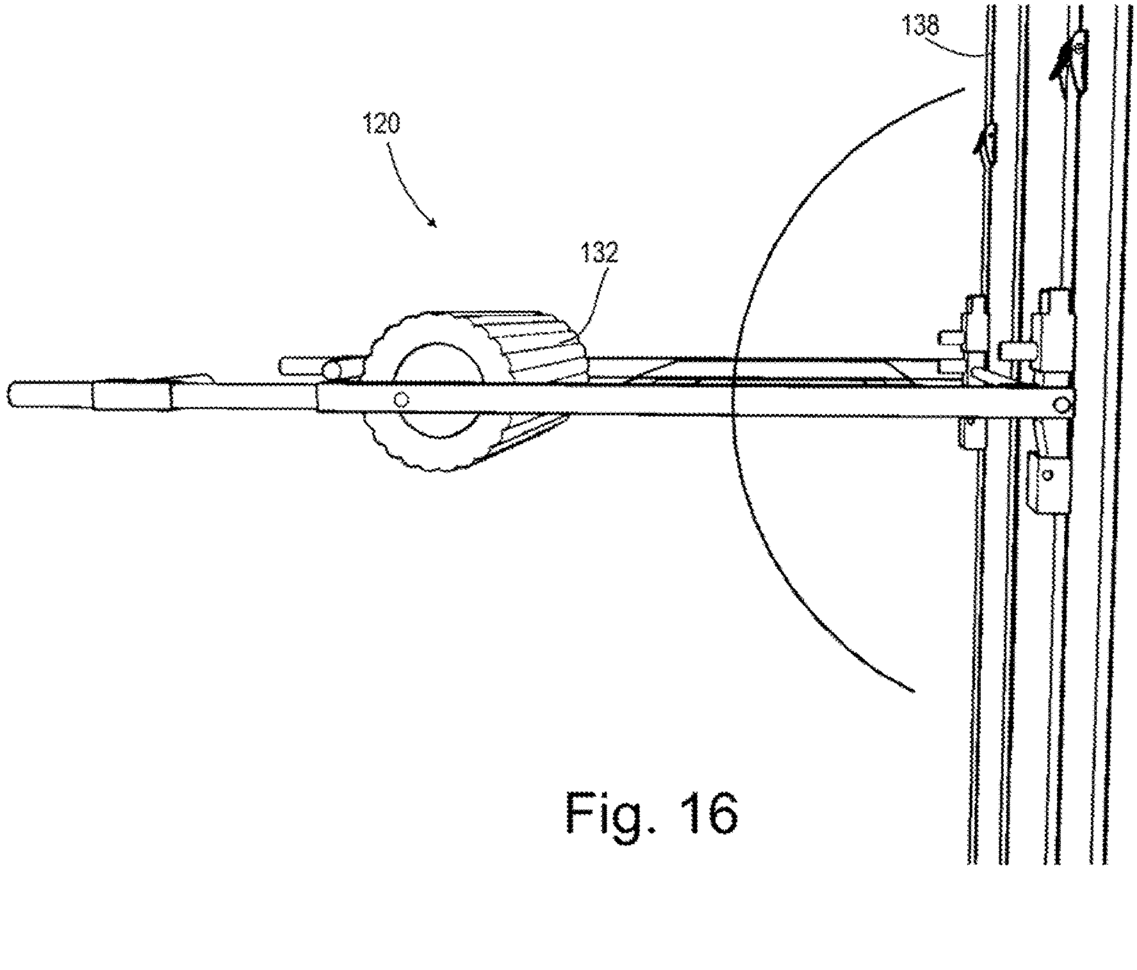
FIG. 16 is a side view of the example shown in FIG. 13.

To provide for vertical repositioning of the struts 160 and roller 132, each strap may be provided with an adjuster frame 190 as shown in FIG. 15. This adjuster frame provides a vertically repositionable pivot for the roller frame including struts and roller 132. In one example, this is provided by a wedge 191 which compresses the strap 138 between the inner surface of the adjuster frame 190 and the outer surface of the wedge 191 as the wedge 191 repositions downward. A pin 192 or equivalent may engage the sloped (incline) surface 193 and ease in use. The weight of the wedge 191 and roller frame provide the wedging force in one example. In another example, a spring 194 may be provided to add additional compression strength.

To release the wedging force, a user may press a plurality of protrusions including a frame protrusion 195 and a wedge protrusion 196 toward each other. This action releasing the wedging force and allowing the pivot assembly 130 to rotate about the adjuster frame, particularly about the wedge 191.

Figure 18:
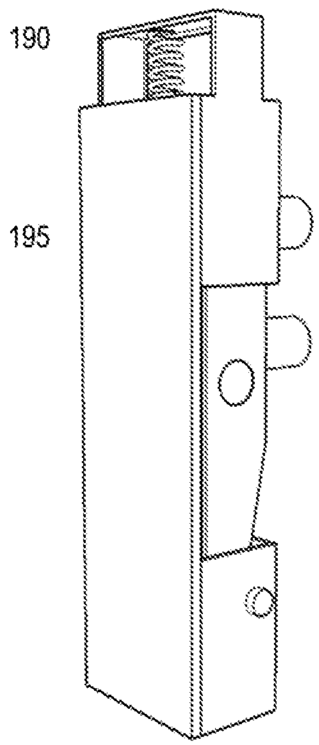
FIG. 18 is a rear perspective view of the adjuster frame component.
Figure 19:
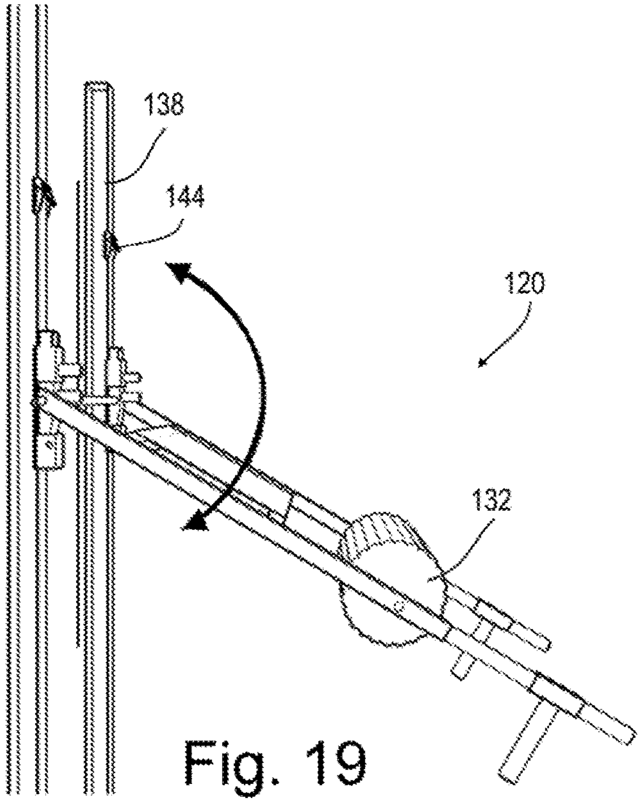
FIG. 19 is a view of the device as shown in FIG. 16 with the roller arm moved to a lower position.
Figure 20:
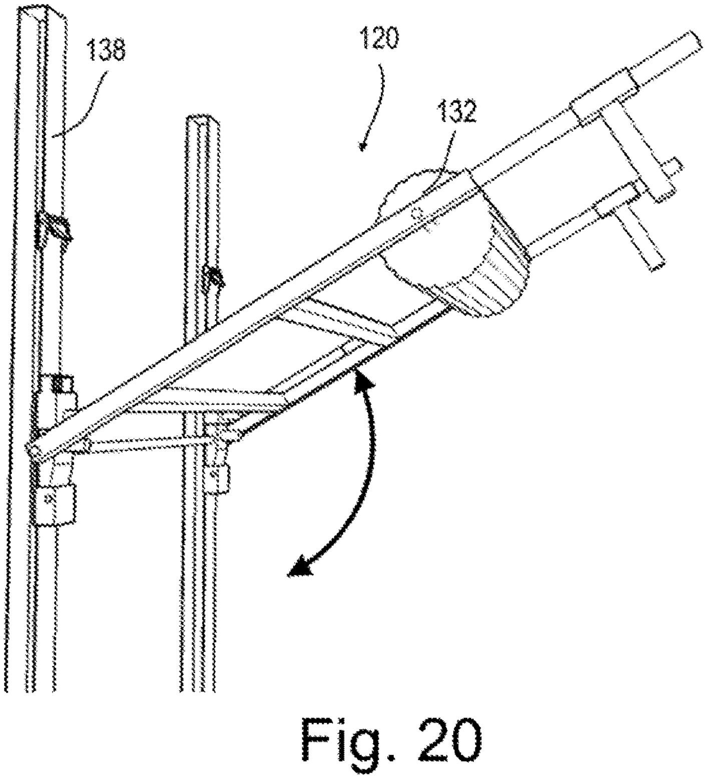
FIG. 20 is a view of the device as shown in FIG. 16 with the roller arm moved to a higher position.

In FIG. 18, it can be seen that the surface of the adjuster frame 190 positioned against the door may comprise a malleable or otherwise mark resistant and high friction pad 195. As the user 52 presses against the roller, and this pressure is transmitted through the struts to the pad 195, the pad 195 holds the pivot assembly 130 in position against the door without sliding or marring.

Figure 17:
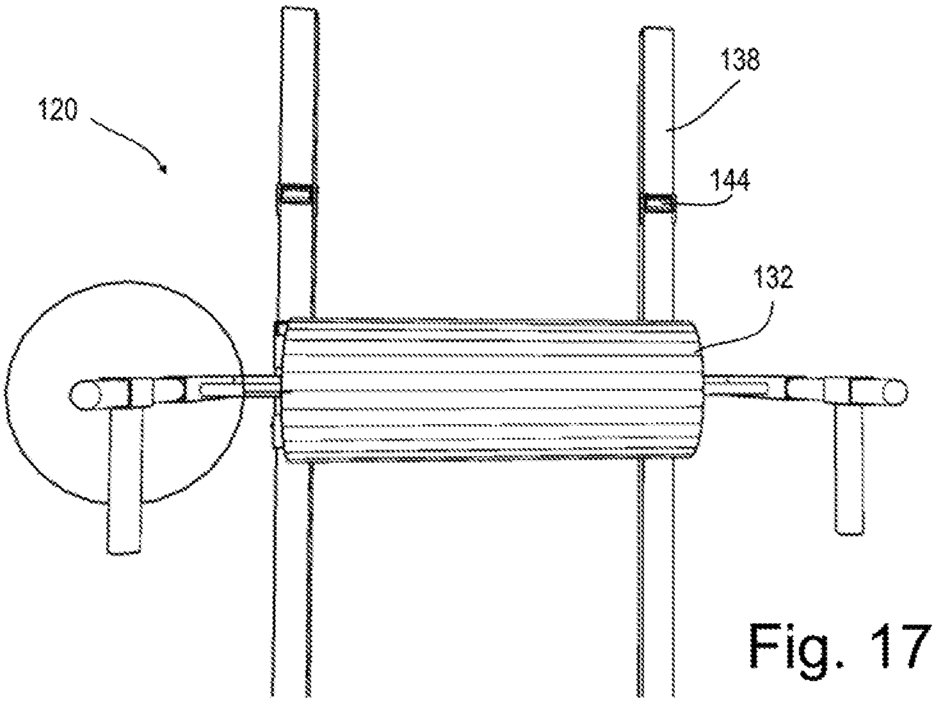
FIG. 17 is a front view of the example shown in FIG. 13.

FIG. 17 shows a different embodiment of the handles 154 which may include a linear end handle 154*a* and an angular handle 1546. As can be appreciated in FIG. 17 and in FIG. 12 the handle 154B may be linearly repositionable along the strut(s) 160 and may be rotationally repositionable about the strut 160.

Figure 21:
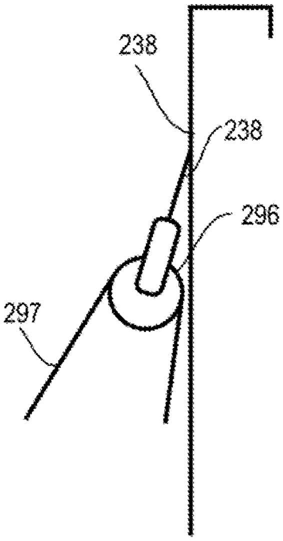
FIG. 21 is an enlarged view of a portion of the device as shown in FIG. 23.
Figure 22:
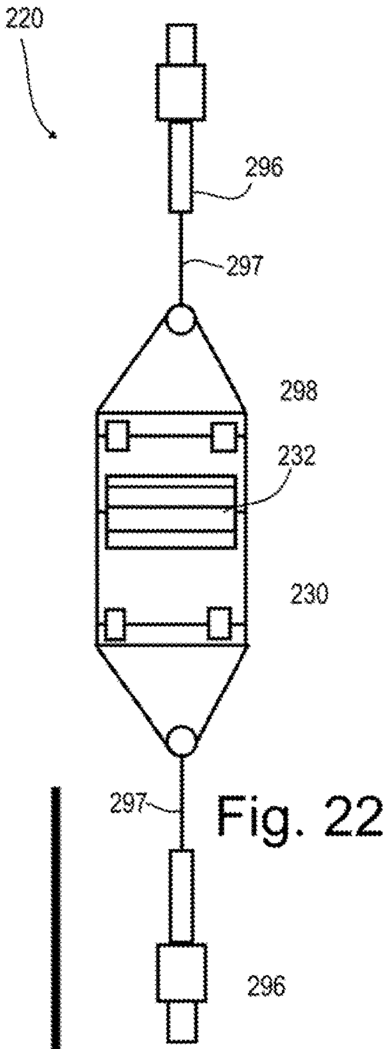
FIG. 22 is a front view of the device shown in FIG. 23.
Figure 23:
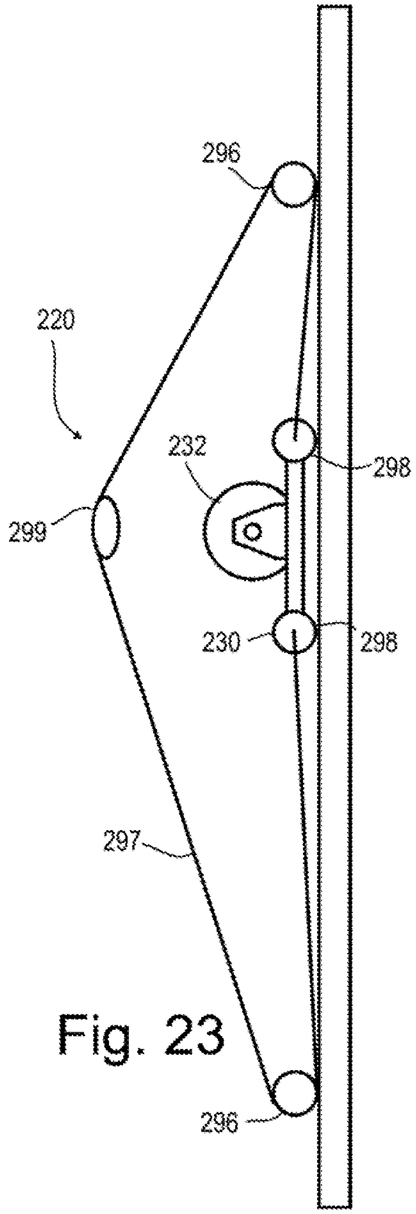
FIG. 23 is a side view of another example of the mounted massage roller attached to a door.
Figure 24:
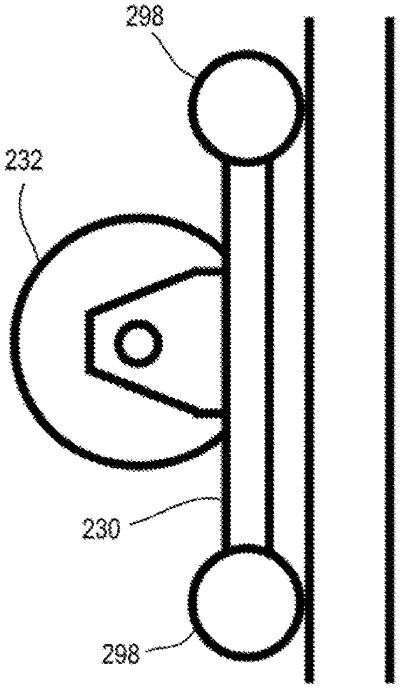
FIG. 24 is an enlarged view of the rolling portion of the device shown in FIG. 23.

Looking to FIG. 21 is shown another example where a loop 238 is attached to the strap or bracket as previously described, and a pulley 296 attached thereto. A rope 297 is then passed around the pulleys 296 and attached to a rolling frame 230. Instead of pivoting as previously described, this example includes a roller assembly including a plurality of rollers 298 (sliding devices may also work) which roll against the door as a user moves the rope 297 up, and down, or in and out. A handle 299 may be provided for this use.

While the present invention is illustrated by description of several embodiments and while the illustrative embodiments are described in detail, it is not the intention of the applicants to restrict or in any way limit the scope of the appended claims to such detail. For example, many components from alternate examples and embodiments may be used in other examples and embodiments. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A mounted massage roller comprising:
- a mounting assembly removably mounted to a fixed structure;
- a pivot assembly attached to the mounting assembly at a hinge forming a horizontal hinge axis about which the hinge rotates;
- the pivot assembly rotatable about the hinge axis relative to the mounting assembly;
- the pivot assembly comprising at least one handle configured to be grasped by a patient to rotate the pivot assembly about the hinge, the handle operatively connected to the pivot assembly to rotate therewith;
- the pivot assembly comprising at least one roller attached to the pivot assembly between the at least one handle and the hinge;
- the roller configured to roll about a roller axis parallel to the hinge axis;
- each roller having a radially outward surface configured to roll against the patient as the patient moves the pivot assembly about the hinge axis.

2. The mounted massage roller as recited in claim 1 wherein the fixed structure is a door.

3. The mounted massage roller as recited in claim 1 wherein the pivot assembly is vertically positionable on the mounting assembly.

4. The mounted massage roller as recited in claim 1 wherein each roller has an outer diameter of between 2" and 8".

5. The mounted massage roller as recited in claim 1 wherein each roller has an outer surface having a Young's modulus on the order of (GPa) 30-70.

* * * * *